A. H. WALKER.
SEA OILING PROJECTILE.
No. 10,958. Reissued Sept. 4, 1888.
Fig. 3
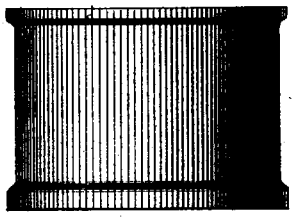
Fig. 4
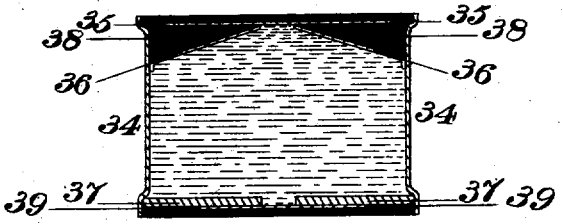
Fig. 1
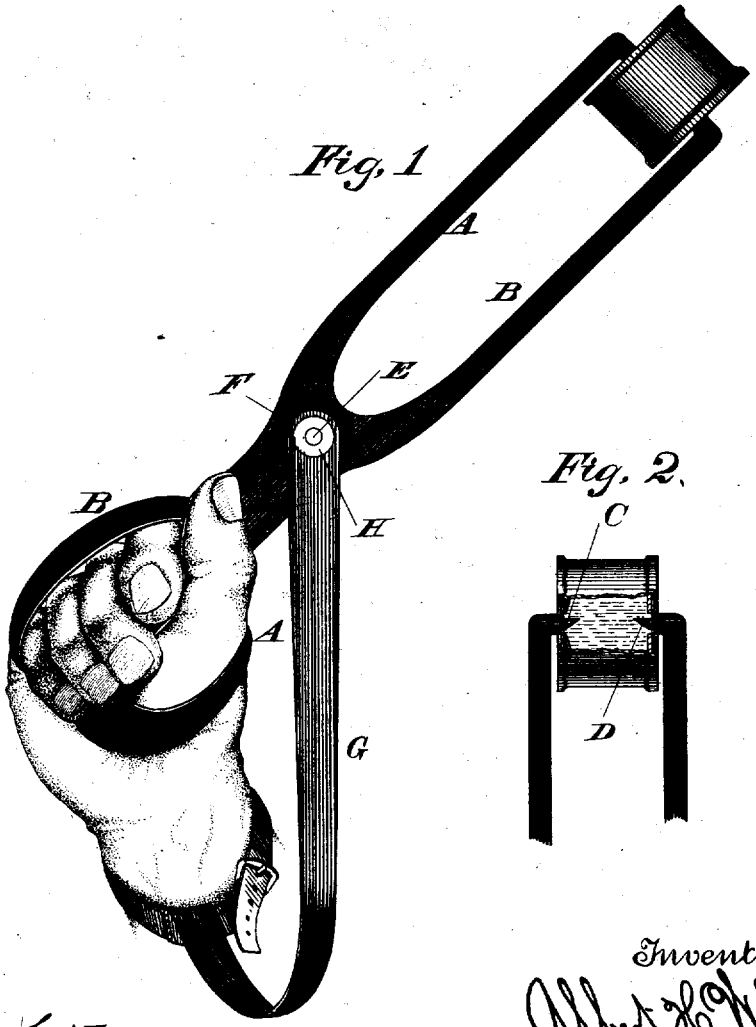
Fig. 2.
Witnesses
John H. White
Harry R. Williams.
Inventor.
Albert H. Walker
N. PETERS, Photo-Lithographer, Washington, D. C.

UNITED STATES PATENT OFFICE.

ALBERT H. WALKER, OF HARTFORD, CONNECTICUT.

SEA-OILING PROJECTILE.

SPECIFICATION forming part of Reissued Letters Patent No. 10,958, dated September 4, 1888.

Original No. 380,370, dated April 3, 1888. Application for reissue filed July 13, 1888. Serial No. 279,880.

*To all whom it may concern:*

Be it known that I, ALBERT H. WALKER, of Hartford, Connecticut, have invented a new and useful Sea-Oiling Projectile, of which the following description and claim constitute the specification, and which is illustrated by the accompanying sheet of drawings.

This projectile is adapted to contain oil and to be thrown from a ship into the sea and to discharge that oil upward through the water to the surface of the waves, and thus to allay the combers which would otherwise form upon their crests.

Figure 1 of the drawings is a view of a projector clasped in the right hand of a sailor and clasping the projectile between its forward ends. Fig. 2 is a view of the upper part of Fig. 1, showing the projectile partly in section, so as to exhibit the manner in which it is held between the forward ends of the projector. Fig. 3 is an exterior view of the projectile, and Fig. 4 is a central vertical section of the projectile.

The letters A and B indicate the two levers which constitute the principal parts of the projector. These levers are respectively provided at their forward ends with the inwardly-extending prongs C and D, and their rear ends are made in the form of the rear ends of the two members of tailors' shears, and they are pivoted together by the bolt E and secured in position by the nut F and a corresponding nut on the other side of the two levers. The strap G is preferably fastened to the bolt E by means of the nut H at one of its ends, so that it may be attached at its other end to the wrist of a sailor, as shown in Fig. 1.

The numeral 34 indicates the body of the projectile, and the projectile is preferably cylindrical in form, though it may be made square or octagonal, or in any other convenient outline, and may be manufactured by inserting the disk 35 in one end of that body and soldering it to the annular shoulder upon which, in Fig. 4, it is shown to rest, and then by inserting the convex and centrally-perforated disk 36 in the other end of the body and pressing it up until its truncated apex is in contact with the disk 35, and then soldering the interior border of the disk 36 to the inside of the disk 35 and the exterior border of the disk 36 to the interior of the body 34, and thereupon in inserting the perforated disk 37 in the opposite end of the body 34 until it rests, as shown, upon the adjacent annular shoulder in that end, and then pouring oil through the aperture in the disk 37 until all of the interior of the projectile except the annular air-chamber 38 is filled with oil, and, finally, in inserting the disk 39 upon the outside of the disk 37 and soldering it firmly in place by a circle of solder extending entirely around its border and entirely around the adjacent inner border of the body 34.

When the filled projectile of Fig. 3 is to be thrown into the sea, it is impaled between the prongs of the forward ends of the levers A and B, as shown in Figs. 1 and 2. Then the sailor grasps the rear ends of the levers, as shown in Fig. 2, and swings his arm as if he were about to throw a ball, and at the instant that his arm reaches its utmost stretch he opens his hand, so as to separate the rear ends of the levers A and B, and also to separate the forward ends of those levers, and thus to extract the prongs C and D from the openings which they made in the disks 35 and 39, respectively. Thus the projectile is hurled into the sea.

During the flight of the projectile through the air the oil is prevented from passing out through the openings by reason of the smallness of those openings and the shortness of the time of that flight. When the projectile reaches the water, its momentum carries it slightly below the surface, where it floats with the air-chamber 38 upward. Thereupon the oil is emitted from the projectile through its upper opening and rises to the surface of the sea, and is replaced by water admitted through the lower opening in the projectile. The length of time occupied in the emission and rising of the oil mainly depends upon the size of the upper opening as compared with the bulk and fluidity of the oil to be emitted. A projectile two inches in diameter and an inch and a half long will hold about two ounces of oil, and when its upper opening is an eighth of an inch in diameter, and when the oil is of proper fluidity, the emission will be completed in about five minutes.

Two ounces of oil applied to a raging sea will allay the combers of the waves over two acres of water, as was proved by the experiment made by Captain Smith, of the British bark Wallace, on the Atlantic Ocean, September 21, 1886. It follows from this fact that when lying to or when lowering or hoisting boats in a heavy sea the combers can be kept several hundred yards away from a ship by throwing a few of these projectiles into the water around the ship and a hundred yards away from the sides of the same and by repeating the operation from time to time, if required.

The disk 37 or the air-chamber 38, or both of them, may be omitted from the projectile, and its upright buoyancy a little below the surface of the sea be otherwise secured; but whatever means are adopted for that purpose they should be so proportioned to each other and to the weight of the projectile and its contents as to cause the projectile to float with one opening upward and the other opening downward a little below the surface of the water. To produce this result, one-half of the filled projectile must be specifically lighter than water and the other half must be specifically heavier than water, and the entire projectile must be nearly or quite identical with water in point of specific gravity.

The oil in the projectile may be fish-oil, linseed-oil, olive-oil, or crude petroleum, and still other oils will produce beneficial results; but fish-oil is probably best, except when the projectiles are to be used in cold weather, when fish-oil mixed with mineral oil to give it fluidity is excellent.

I do not herein claim the projector which I describe and show, because I do describe and claim that projector in Letters Patent No. 381,732 of the United States of America.

I claim as my invention—

A sea-oiling projectile consisting of an oil-filled, tightly-sealed, and easily-puncturable shell, one half of which is provided with an air-chamber or its equivalent, and the other half of which is provided with a weight or its equivalent, and the whole of which is quite or nearly identical with water in specific gravity, substantially as described.

Hartford, Connecticut, July 6, 1888.

ALBERT H. WALKER.

Witnesses:
WM. WALDO HYDE,
FREDK. E. FULLER.